(12) United States Patent
Liu et al.

(10) Patent No.: US 10,163,538 B2
(45) Date of Patent: Dec. 25, 2018

(54) METHOD OF PREPARING GRAPHENE-COATED ALUMINA AND GRAPHENE-COATED ALUMINA PREPARED USING THE METHOD

(71) Applicant: Jianhong Liu, Shenzhen (CN)

(72) Inventors: Jianhong Liu, Shenzhen (CN);
Qianling Zhang, Shenzhen (CN);
Chuanxin He, Shenzhen (CN);
Chuhong Liao, Shenzhen (CN)

(73) Assignee: Jianhong Liu, Shenzhen (CN)

( * ) Notice: Subject to any disclaimer, the term of this patent is extended or adjusted under 35 U.S.C. 154(b) by 58 days.

(21) Appl. No.: 14/981,989

(22) Filed: Dec. 29, 2015

(65) Prior Publication Data
US 2016/0189819 A1  Jun. 30, 2016

(30) Foreign Application Priority Data
Dec. 30, 2014  (CN) .......................... 2014 1 0839194

(51) Int. Cl.
*H01B 1/00* (2006.01)
*H01B 1/02* (2006.01)
*C09K 5/14* (2006.01)

(52) U.S. Cl.
CPC ...... *H01B 1/02* (2013.01); *C09K 5/14* (2013.01)

(58) Field of Classification Search
CPC ................................................ C01B 31/0446
See application file for complete search history.

(56) References Cited

U.S. PATENT DOCUMENTS

2001/0031831 A1* 10/2001 Miyoshi .................. C08L 71/12
525/138
2013/0251888 A1* 9/2013 Chang .................... B82Y 40/00
427/11

FOREIGN PATENT DOCUMENTS

CN          104096836 A   * 10/2014

OTHER PUBLICATIONS

CN104096836A, machine translation (Oct. 15, 2015).*
Tong et al., "Preparation of Graphene Nanosheet/Alumina Composites," 2012, Asian Journal of Chemistry, vol. 24, No. 9, pp. 3933-3935.*

* cited by examiner

*Primary Examiner* — Robert A Vetere
(74) *Attorney, Agent, or Firm* — Matthias Scholl, PC; Matthias Scholl

(57) ABSTRACT

A method of preparing graphene-coated alumina, the method including: (1) preparing a liquid polyacrylonitrile (LPAN) solution, stirring the LPAN solution at between 100 and 200° C. to yield a cyclized polyacrylonitrile solution; (2) heating the cyclized LPAN solution at between 200 and 300° C. to yield a thermally-oxidized polyacrylonitrile (OPAN) having a ladder structure; (3) mixing the thermally-oxidized polyacrylonitrile with an aluminum compound, to yield a mixture, and adding a solvent to the mixture, uniformly mixing, to yield a polyacrylonitrile-coated aluminum compound; (4) drying the polyacrylonitrile-coated aluminum compound until the solvent is evaporated, to yield a carbonized precursor-coated aluminum compound; and (5) calcining the carbonized precursor-coated aluminum compound in the presence of an inert gas flow, to yield graphene-coated alumina.

8 Claims, 2 Drawing Sheets

METHOD OF PREPARING GRAPHENE-COATED ALUMINA AND GRAPHENE-COATED ALUMINA PREPARED USING THE METHOD

CROSS-REFERENCE TO RELATED APPLICATIONS

Pursuant to 35 U.S.C. § 119 and the Paris Convention Treaty, this application claims the benefit of Chinese Patent Application No. 201410839194.4 filed Dec. 30, 2014, the contents of which are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The invention relates to a method of preparing a graphene-coated alumina as well as a graphene-coated alumina prepared using the method.

Description of the Related Art

Aluminum oxide has a relatively high thermal conductivity. However, it is an electrical insulator which makes it not very useful for certain applications.

SUMMARY OF THE INVENTION

In view of the above-described problem, it is one objective of the invention to provide a method of preparing graphene-coated alumina and graphene-coated alumina prepared by the method. The prepared graphene-coated alumina features good thermal and electrical conductivity properties, has uniform particle size distribution and good film-forming property.

To achieve the above objective, in accordance with one embodiment of the invention, there is provided a method of preparing graphene-coated alumina, the method comprising:

(1) preparing a liquid polyacrylonitrile (LPAN) solution as a carbon source, stirring the LPAN solution at a temperature of between 100 and 200° C. for between 100 and 200 hrs to yield a cyclized polyacrylonitrile solution;

(2) heating the cyclized LPAN solution at between 200 and 300° C. for between 1 and 10 hrs to yield a thermally-oxidized polyacrylonitrile (OPAN) comprising a ladder structure;

(3) mixing the thermally-oxidized polyacrylonitrile with an aluminum compound with a mass ratio thereof being between 0.1:1 and 0.9:1, to yield a mixture, and adding a solvent to the mixture and uniformly mixing, to yield a polyacrylonitrile-coated aluminum compound;

(4) drying the polyacrylonitrile-coated aluminum compound in an oven at a temperature of between 200 and 250° C. for between 1 and 10 hrs until the solvent is evaporated, to yield a carbonized precursor-coated aluminum compound; and (5) calcining the carbonized precursor-coated aluminum compound in the presence of an inert gas flow of between 10 and 500 mL/min for between 1 and 10 hrs at a temperature of between 700 and 2000° C., to yield a graphene-coated alumina.

In a class of this embodiment, in 1), a dopant is added to and uniformly mixed with the cyclized LPAN solution.

In a class of this embodiment, a mass ratio of the dopant to the LPAN solution is between 0.01:1 and 0.5:1.

In a class of this embodiment, the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, organometallic compound, or a mixture thereof; and the non-metallic dopant is silicon, phosphorus, boron, nitrogen, carbon, sulfur, or a compound thereof, or a mixture thereof.

In a class of this embodiment, the liquid polyacrylonitrile (LPAN) solution employs liquid polyacrylonitrile as a solute and contains no solvent, and the LPAN has a relative molecular weight of between 106 and 100000.

In a class of this embodiment, the PLAN is a homopolymer of acrylonitrile, or a copolymer of acrylonitrile and a vinyl monomer.

In a class of this embodiment, the vinyl monomer is selected from the group of styrene, methyl methacrylate, hydroxyethyl methylacrylate, acrylic acid, itaconic acid.

In a class of this embodiment, in 3), the uniform mixing of the mixture and the solvent is achieved by stirring, ultrasound, or ball milling.

In a class of this embodiment, in 3), the aluminum compound is aluminum oxide or an aluminum salt.

In another aspect, the invention also provides a graphene-coated alumina, which is prepared according to the mentioned-above method.

Advantages of the method of preparing graphene-coated alumina are summarized as follows. The method employs LPAN as a carbon source to modify alumina at normal temperature to yield a precursor, which is calcined at high temperatures to yield graphene-coated alumina powders. The obtained powders have small and uniformly-distributed particle sizes, good adhesion property, and good film forming property.

The method of the invention involves a simple process and low production costs, and the resulting graphene-coated alumina has high purity, high yield, uniform distribution of particle sizes, and good morphology. The LPAN solution contains multiple functional groups, and as a liquid precursor, after being modified using a carbon source, the LPAN can uniformly mix with and bind to the dopant. For example, the powders can be effectively infiltrated into lithium-ion battery electrolytes, which can greatly reduce the internal resistance of lithium-ion batteries, and stabilize the battery capacity and cycle performance, thus improving the overall performance of batteries. In addition, since graphene has good thermal and electrical conductivity properties, the graphene-coated alumina of the invention has better thermal conductivity property than pure alumina powders, and also possesses good electrical conductivity property.

BRIEF DESCRIPTION OF THE DRAWINGS

The invention is described hereinbelow with reference to the accompanying drawings, in which.

DETAILED DESCRIPTION OF THE EMBODIMENTS

Figure 1:
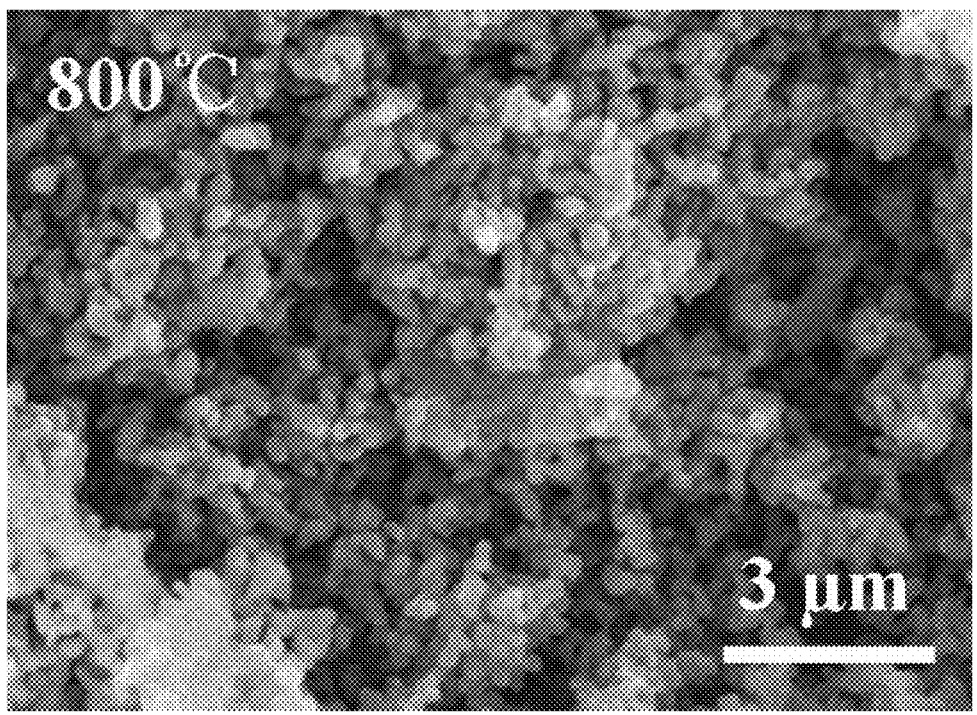
FIG. 1 is a SEM pattern of a product prepared in Example 1, where the product is prepared at a calcination temperature of 800° C.

For further illustrating the invention, experiments detailing a method of preparing a graphene-coated alumina are described below. It should be noted that the following examples are intended to describe and not to limit the invention.

The graphene-coated alumina resulting from solvent thermal treatment presents in powders and has small and uniformly-distributed particle sizes, good adhesion property, and good film forming property. The powders can be effectively infiltrated into lithium-ion battery electrolytes, which can greatly reduce the internal resistance of lithium-ion batteries, and stabilize the battery capacity and cycle performance, thus improving the overall performance of batteries.

The invention provides a method of preparing a graphene-coated alumina, the method comprising:

(1) Preparing a liquid polyacrylonitrile (LPAN) solution as a carbon source, stirring the LPAN solution at between 100 and 200° C. for between 100 and 200 hrs to yield a cyclized polyacrylonitrile solution.

In (1), the liquid LPAN solution is stirred at the temperature of between 100 and 200° C. for between 100 and 200 hrs to yield the cyclized polyacrylonitrile solution. As a result, the linear LPAN molecule is transformed into a thermostable ladder structure, which can resist the pyrolysis during the high-temperature carbonization, thereby ensuring the high carbon residue rate and stable physicochemical properties. In the end, a carbon layer having a grapheme-like structure is formed.

The invention employs the PLAN instead of dilute PLAN as a carbon source and solute, and the liquid polyacrylonitrile has a relative molecular weight of between 106 and 100000, particularly, between 150 and 25000. The PLAN contains no solvent. The polymer is a long chain macromolecule with high molecular weight and high carbon content, and thus provides a structure base for the carbon coating.

Preferably, the LPAN is a homopolymer of acrylonitrile, or a copolymer of acrylonitrile and a vinyl monomer, and the vinyl monomer is selected from the group of styrene, methyl methacrylate, hydroxyethyl methylacrylate, acrylic acid, itaconic acid.

The carbon source can optionally be polypyrrole, polythiophene, polyaniline, polyacetylene, polystyrene, polycarbonate, or polyamide resin, particularly polyaniline. Polyaniline can be firmly bound to an aluminum compound, and the formed carbon film structure is complete, which can effectively improve the electrical conductivity property of the graphene-coated alumina composite material.

Preferably, the invention employs the self-made PLAN as a carbon source, and the former presents a liquid in the temperature of between minus 80° C. and 200° C., with a concentration of 0.8 and 1.2 g/cm$^2$.

Preferably, in 1), a dopant is added to and uniformly mixed with the cyclized LPAN solution. The LPAN solution contains multiple functional groups, and as a liquid precursor, after being modified using a dopant, the LPAN can uniformly mix with and bind to the dopant.

As an improvement, in 1), a dopant is added to and uniformly mixed with the cyclized LPAN solution, and the mixing is achieved by stirring, ultrasound, or ball milling.

The mass ratio of the dopant to the LPAN is between 0.01:1 and 0.5:1. The cyclized LPAN solution has multiple functional groups, which are adapted to tightly bind to the dopant or carbon material. Part of LPAN functional groups can coordinate with the dopant to achieve compatibility and coating in the molecular level. After grinding or stirring, the LPAN and the dopant are fully mixed and contacted. Preferably, the mixing is achieved by ball milling.

Preferably, the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, organometallic compound, or a mixture thereof; and the non-metallic dopant is silicon, phosphorus, boron, nitrogen, carbon, sulfur, or a compound thereof, or a mixture thereof. Preferably, the dopant is tin powder. The tin-doped PLAN has better stability, and tin powder can further improve the catalytic performance of graphene-coated alumina.

(2) Heating the cyclized LPAN solution at between 200 and 300° C. for between 1 and 10 hrs to yield a thermally-oxidized polyacrylonitrile (OPAN) comprising a ladder structure.

Preferably, the heating time is 8 hours, so that the thermally-oxidized polyacrylonitrile has more stable chemical properties.

(3) Mixing the thermally-oxidized polyacrylonitrile with an aluminum compound with a mass ratio thereof being between 0.1:1 and 0.9:1, to yield a mixture, and adding a solvent to the mixture, uniformly mixing, to yield a polyacrylonitrile-coated aluminum compound.

Preferably, the aluminum compound is aluminum oxide or an aluminum salt.

The solvent is a hydrophilic solvent or a hydrophobic solvent, and a mass ratio of the mixture of the PLAN and the aluminum compound to the solvent is between 0.1:1 and 0.5:1.

The particle size of the aluminum compound is between 8 nm and 100 μm. The aluminum compound is sieved using a sieve having a mesh of 200-400 mesh, preferably, 300 mesh.

Preferably, the dopant can be further added to a mixture of the thermally-oxidized polyacrylonitrile and the aluminum compound, and the mixing is achieved by stirring, ultrasound, or ball milling. The further doping can provide better coating effect and compatibility at the molecular level.

(4) Drying the polyacrylonitrile-coated aluminum compound in an oven at a temperature of between 200 and 250° C. for between 1 and 10 hrs until the solvent is evaporated, to yield a carbonized precursor-coated aluminum compound. Preferably, the drying time is 3 hours. The carbonized precursor-coated aluminum compound can be ground to be powders.

(5) Calcining the carbonized precursor-coated aluminum compound in the presence of an inert gas flow of between 10 and 500 mL/min for between 1 and 10 hrs at a temperature of between 700 and 2000° C., to yield a graphene-coated alumina. Preferably, the calcination temperature is 900° C. and the time lasts one hour.

Preferably, the inert gas is nitrogen or argon.

The invention also provides a graphene-coated alumina prepared according to the above-mentioned method.

EXAMPLE 1

150 g of liquid polyacrylonitrile (LPAN) solution (molecular weight 4000) were stirred at 120° C. for 120 hrs, to yield a cyclized polyacrylonitrile solution. The cyclized LPAN solution was heated at 300° C. for 8 hrs to yield a thermally-oxidized polyacrylonitrile (OPAN) comprising a ladder structure. The thermally-oxidized polyacrylonitrile was mixed with 500 g of aluminum oxide ($Al_2O_3$) and 50 mL of a solvent. The resulting mixture was ball milled using a planetary type ball mill for 10 hrs (400 rad/min), and the ratio of grinding media to material was 7:1. Thereafter, a product was collected and dried in an oven at 220° C. for 3 hrs to yield a thermally-oxidized precursor (low temperature carbonized precursor-coated aluminum compound). The thermally-oxidized precursor was calcined in a ceramic boat in the presence of a nitrogen gas flow of 150 mL/min for one hour at the temperature of 800° C., and then was cooled to room temperature, to yield graphene-coated alumina. The morphology of the product is shown in FIG. 1.

EXAMPLE 2

Figure 2:
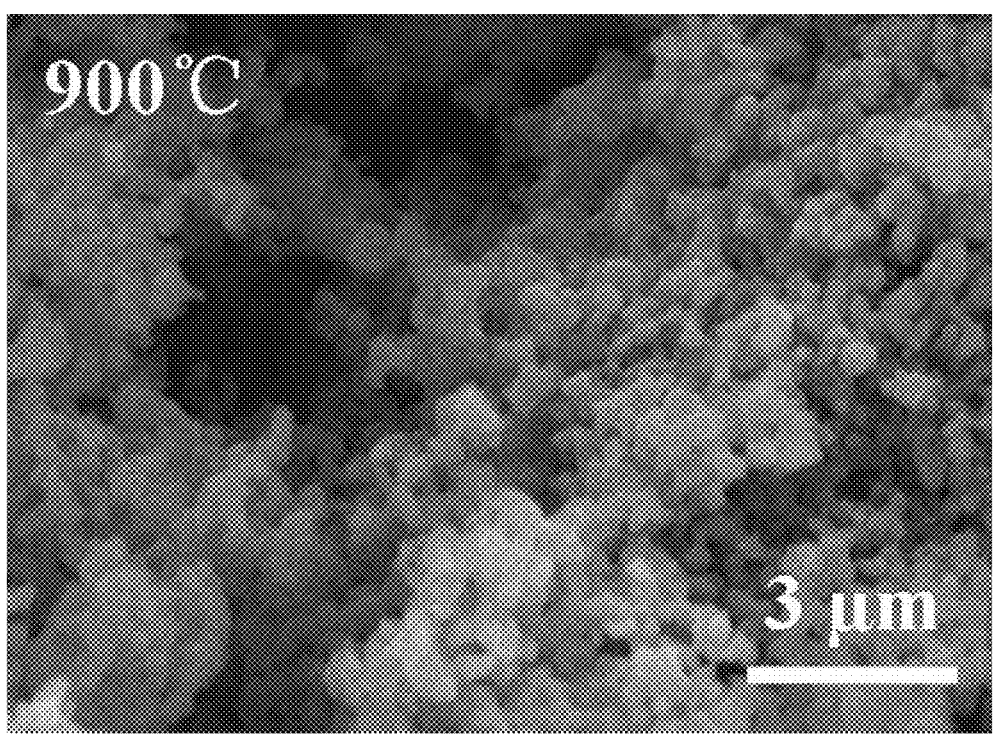
FIG. 2 is a SEM pattern of a product prepared in Example 2, where the product is prepared at a calcination temperature of 900° C.
Figure 3:
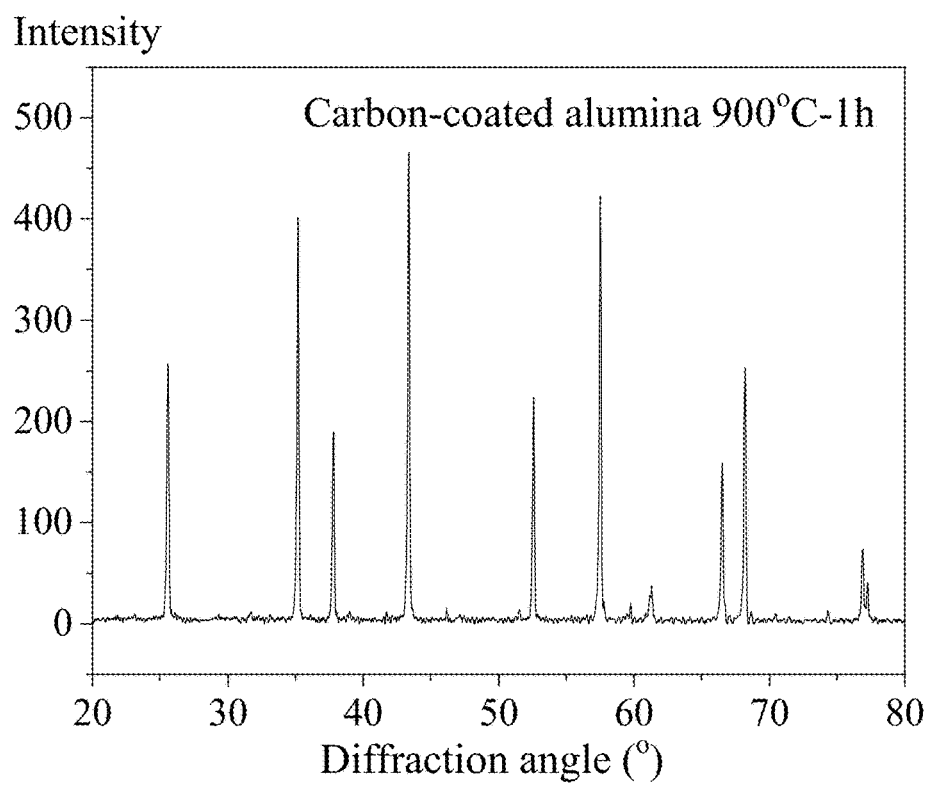
FIG. 3 is an XRD pattern of a product prepared in Example 2, where the product is graphene-coated alumina.
Figure 4:
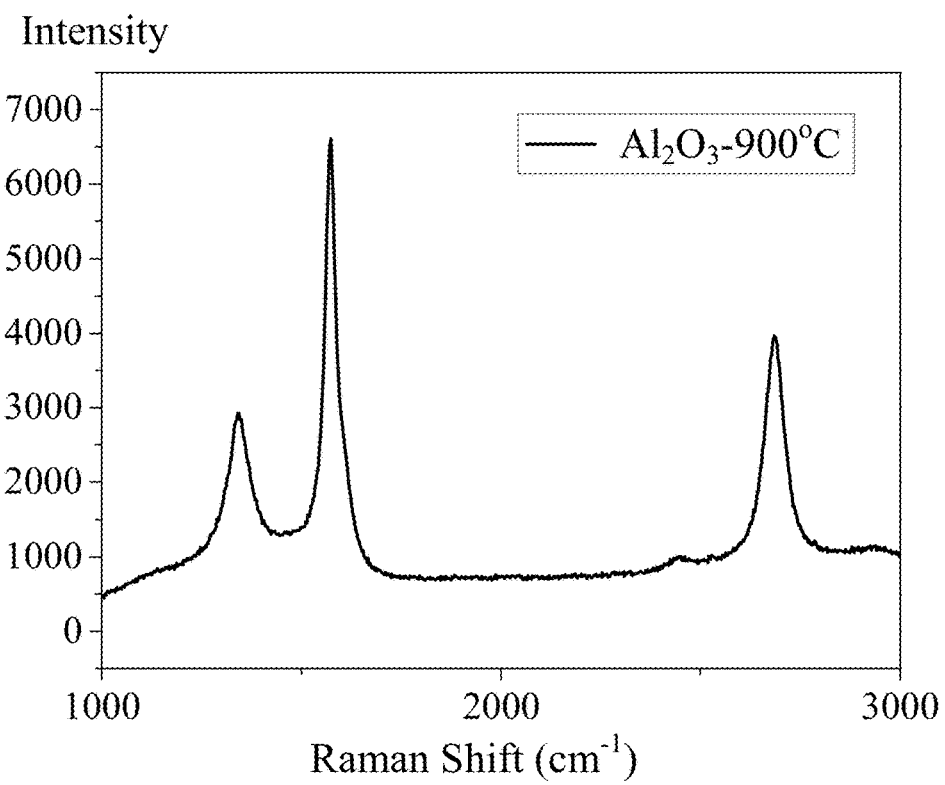
FIG. 4 is a Raman spectrogram of a product prepared in Example 2, where the product is graphene-coated alumina.

100 g of liquid polyacrylonitrile (LPAN) solution (molecular weight 4000) were stirred at 120° C. for 120 hrs, to yield a cyclized polyacrylonitrile solution. The cyclized LPAN solution was heated at 300° C. for 8 hrs to yield a thermally-oxidized polyacrylonitrile (OPAN) comprising a ladder structure. The thermally-oxidized polyacrylonitrile was mixed with 500 g of aluminum oxide ($Al_2O_3$) and 50 mL of a solvent. The resulting mixture was ball milled using a planetary type ball mill for 10 hrs (400 rad/min), and the ratio of grinding media to material was 7:1. Thereafter, a product was collected and dried in an oven at 220° C. for 3 hrs to yield a thermally-oxidized precursor (low temperature carbonized precursor-coated aluminum compound). The thermally-oxidized precursor was calcined in a ceramic boat in the presence of a nitrogen gas flow of 150 mL/min for one hour at the temperature of 900° C., and then was cooled to room temperature, to yield graphene-coated alumina. The morphology of the product is shown in FIG. 2, the XRD pattern thereof is shown in FIG. 3, and the Raman spectrogram thereof is shown in FIG. 4.

EXAMPLE 3

200 g of liquid polyacrylonitrile (LPAN) solution (molecular weight 1600) were stirred at 100° C. for 200 hrs, to yield a cyclized polyacrylonitrile solution. The cyclized LPAN solution was heated at 200° C. for 10 hrs to yield a thermally-oxidized polyacrylonitrile (OPAN) comprising a ladder structure. The thermally-oxidized polyacrylonitrile was mixed with 500 g of aluminum oxide ($Al_2O_3$) and 50 mL of a solvent. The resulting mixture was ball milled using a planetary type ball mill for 10 hrs (400 rad/min), and the ratio of grinding media to material was 7:1. Thereafter, a product was collected and dried in an oven at 250° C. for one hour to yield a thermally-oxidized precursor (low temperature carbonized precursor-coated aluminum compound). The thermally-oxidized precursor was calcined in a ceramic boat in the presence of a nitrogen gas flow of 10 mL/min for one hour at the temperature of 2000° C., and then was cooled to room temperature, to yield graphene-coated alumina.

EXAMPLE 4

150 g of liquid polyacrylonitrile (LPAN) solution (molecular weight 25000) were stirred at 200° C. for 100 hrs, to yield a cyclized polyacrylonitrile solution. The cyclized LPAN solution was heated at 300° C. for one hour to yield a thermally-oxidized polyacrylonitrile (OPAN) comprising a ladder structure. The thermally-oxidized polyacrylonitrile was mixed with 500 g of aluminum oxide ($Al_2O_3$) and 50 mL of a solvent. The resulting mixture was ball milled using a planetary type ball mill for 10 hrs (400 rad/min), and the ratio of grinding media to material was 7:1. Thereafter, a product was collected and dried in an oven at 200° C. for 10 hrs to yield a thermally-oxidized precursor (low temperature carbonized precursor-coated aluminum compound). The thermally-oxidized precursor was calcined in a ceramic boat in the presence of a nitrogen gas flow of 500 mL/min for 10 hours at the temperature of 700° C., and then was cooled to room temperature, to yield graphene-coated alumina.

EXAMPLE 5

120 g of liquid polyacrylonitrile (LPAN) solution (molecular weight 10000) were stirred at 160° C. for 130 hrs, to yield a cyclized polyacrylonitrile solution. The cyclized LPAN solution was heated at 240° C. for 4 hrs to yield a thermally-oxidized polyacrylonitrile (OPAN) comprising a ladder structure. The thermally-oxidized polyacrylonitrile was mixed with 500 g of aluminum oxide ($Al_2O_3$) and 50 mL of a solvent. The resulting mixture was ball milled using a planetary type ball mill for 10 hrs (400 rad/min), and the ratio of grinding media to material was 7:1. Thereafter, a product was collected and dried in an oven at 240° C. for 5 hrs to yield a thermally-oxidized precursor (low temperature carbonized precursor-coated aluminum compound). The thermally-oxidized precursor was calcined in a ceramic boat in the presence of a nitrogen gas flow of 280 mL/min for 3 hours at the temperature of 1600° C., and then was cooled to room temperature, to yield graphene-coated alumina.

EXAMPLE 6

250 g of liquid polyacrylonitrile (LPAN) solution (molecular weight 10000) were stirred at 140° C. for 110 hrs, to yield a cyclized polyacrylonitrile solution. The cyclized LPAN solution was heated at 260° C. for 6 hrs to yield a thermally-oxidized polyacrylonitrile (OPAN) comprising a ladder structure. The thermally-oxidized polyacrylonitrile was mixed with 500 g of aluminum oxide ($Al_2O_3$) and 50 mL of a solvent. The resulting mixture was ball milled using a planetary type ball mill for 10 hrs (400 rad/min), and the ratio of grinding media to material was 7:1. Thereafter, a product was collected and dried in an oven at 230° C. for 6 hrs to yield a thermally-oxidized precursor (low temperature carbonized precursor-coated aluminum compound). The thermally-oxidized precursor was calcined in a ceramic boat in the presence of a nitrogen gas flow of 320 mL/min for 2.5 hours at the temperature of 1200° C., and then was cooled to room temperature, to yield graphene-coated alumina.

The obtained graphene-coated alumina presents in the form of powders. The powders have small and uniformly-distributed particle sizes, good adhesion property, and good film forming property.

The method of the invention involves a simple process and low production costs, and the resulting graphene-coated alumina has high purity, high yield, uniform distribution of particle sizes, and good morphology. The LPAN solution contains multiple functional groups, and as a liquid precursor, after being modified using a dopant, the LPAN can uniformly mix with and bind to the dopant. The graphene-coated alumina can be used for preparation of diaphragms of lithium ion batteries, conductive fillers of rubber, and conductive heat dissipation materials.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A method of preparing graphene-coated alumina, the method comprising:
   (1) preparing a liquid polyacrylonitrile (LPAN) solution as a carbon source, stirring the LPAN solution at a temperature of between 100 and 200° C. for between 100 and 200 hrs to yield a cyclized polyacrylonitrile solution (cyclized LPAN solution);
   (2) heating the cyclized LPAN solution at between 200 and 300° C. for between 1 and 10 hrs to yield thermally-oxidized polyacrylonitrile (OPAN);
   (3) mixing the OPAN with an aluminum compound at a mass ratio of the OPAN to the aluminum compound of between 0.1:1 and 0.9:1 to yield a mixture, and mixing the mixture with a solvent to yield a polyacrylonitrile-coated aluminum compound;
   (4) drying the polyacrylonitrile-coated aluminum compound at a temperature of between 200 and 250° C. for between 1 and 10 hrs to yield a carbonized precursor-coated aluminum compound; and
   (5) calcining the carbonized precursor-coated aluminum compound in the presence of an inert gas having a flow rate of between 10 and 500 mL/min for between 1 and 10 hrs at a temperature of between 1600 and 2000° C. to yield graphene-coated alumina;

wherein:
   the aluminum compound is alumina;
   the graphene-coated alumina comprises alumina particles coated with graphene; and
   the alumina particles have a particle size of between 8 nm and 100 μm.

2. The method of claim 1, wherein in (1), a dopant is added to and uniformly mixed with the cyclized LPAN solution.

3. The method of claim 2, wherein a mass ratio of the dopant to the LPAN solution is between 0.01:1 and 0.5:1.

4. The method of claim 2, wherein the dopant is a metallic dopant or a non-metallic dopant; the metallic dopant is a pure metal comprising tin, copper, silver, aluminum, chromium, iron, manganese, titanium, nickel, and cobalt, or a metal oxide, metal nitride, metal boride, metal fluoride, metal bromide, metal sulfide, organometallic compound, or a mixture thereof; and the non-metallic dopant is silicon, phosphorus, boron, nitrogen, carbon, sulfur, or a compound thereof, or a mixture thereof.

5. The method of claim 1, wherein in (1), a solute of the LPAN solution is liquid polyacrylonitrile having a relative molecular weight of between 106 and 100000.

6. The method of claim 5, wherein the LPAN is a homopolymer of acrylonitrile, or a copolymer of acrylonitrile and a vinyl monomer.

7. The method of claim 6, wherein the vinyl monomer is styrene, methyl methacrylate, hydroxyethyl methylacrylate, acrylic acid, or itaconic acid.

8. The method of claim 1, wherein in (3), the mixture and the solvent are mixed by stirring, ultrasound, or ball milling.

* * * * *